United States Patent
Kawabata et al.

(10) Patent No.: US 12,259,057 B2
(45) Date of Patent: Mar. 25, 2025

(54) FLUID CONTROL DEVICE

(71) Applicant: Murata Manufacturing Co., Ltd., Kyoto (JP)

(72) Inventors: Yutoku Kawabata, Kyoto (JP); Nobuhira Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 109 days.

(21) Appl. No.: 17/818,758

(22) Filed: Aug. 10, 2022

(65) Prior Publication Data
US 2022/0381361 A1 Dec. 1, 2022

Related U.S. Application Data

(63) Continuation of application No. PCT/JP2021/003549, filed on Feb. 1, 2021.

(30) Foreign Application Priority Data

Feb. 26, 2020 (JP) ................. 2020-030019

(51) Int. Cl.
*F16K 31/00* (2006.01)
*F04B 43/04* (2006.01)
*F16K 99/00* (2006.01)

(52) U.S. Cl.
CPC .......... *F16K 31/005* (2013.01); *F04B 43/043* (2013.01); *F04B 43/046* (2013.01); *F16K 99/0015* (2013.01); *F16K 99/0048* (2013.01)

(58) Field of Classification Search
CPC .. F16K 31/005; F16K 99/007; F16K 99/0015; F16K 99/0048; F16K 2099/0094; F16K 15/14; F04B 43/046; F04B 43/043
See application file for complete search history.

(56) References Cited

U.S. PATENT DOCUMENTS

2013/0055889 A1* 3/2013 Herz .................. F16K 99/0001 92/96
2018/0045191 A1 2/2018 Uruma et al.
(Continued)

FOREIGN PATENT DOCUMENTS

CN 101093009 A 12/2007
CN 104253094 A 12/2014
(Continued)

OTHER PUBLICATIONS

International Search Report for PCT/JP2021/003549 dated Mar. 30, 2021.

*Primary Examiner* — Marina A Tietjen
(74) *Attorney, Agent, or Firm* — McDonald Hopkins LLC

(57) ABSTRACT

A fluid control device includes a first main plate, a second main plate, a driving body, a frame body, a plurality of support bodies, a plurality of gaps, a side wall member, a valve film, and a fixing member. A pump chamber is formed by a flat plate part consisting of the first main plate, the frame body, and the plurality of support bodies, and the second main plate and the side wall member. The valve film is disposed on a main surface of the first main plate on the side where the pump chamber is located. The valve film has an annular shape and fixed to the first main plate by the fixing member so that an outer end thereof is a movable end. The outer end of the valve film overlaps the plurality of gaps located between the plurality of support portions in plan view.

20 Claims, 5 Drawing Sheets

(56) References Cited

U.S. PATENT DOCUMENTS

2018/0159216 A1 6/2018 Kai et al.
2021/0010467 A1 1/2021 Fujisaki et al.

FOREIGN PATENT DOCUMENTS

| CN | 110513280 A | 11/2019 |
| CN | 112640102 A | 4/2021 |
| JP | 2003-214349 A | 7/2003 |
| JP | 2004-308465 A | 11/2004 |
| JP | 2012159935 A | 8/2012 |
| WO | 2016/133024 A1 | 8/2016 |
| WO | 2018194012 A1 | 10/2018 |
| WO | 2019/230159 A1 | 12/2019 |

* cited by examiner

VIBRATION SHAPE

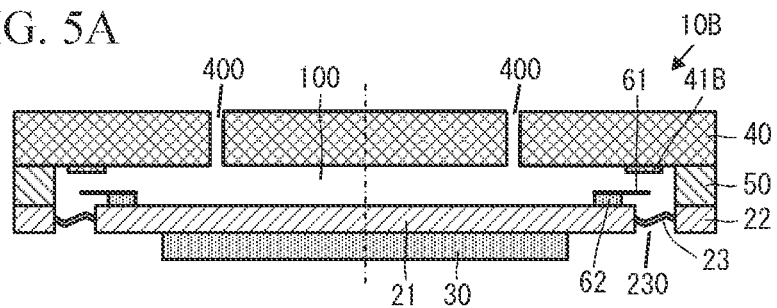
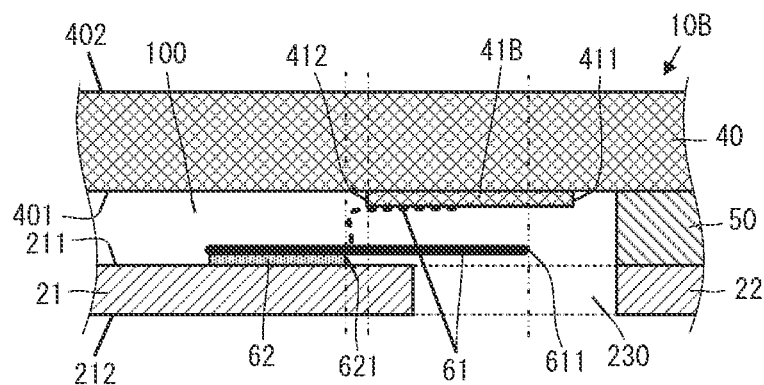
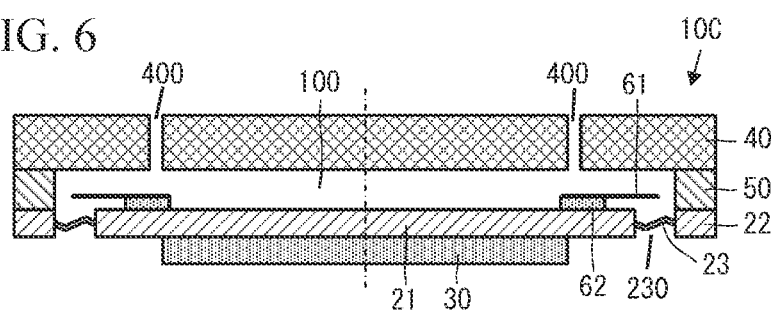
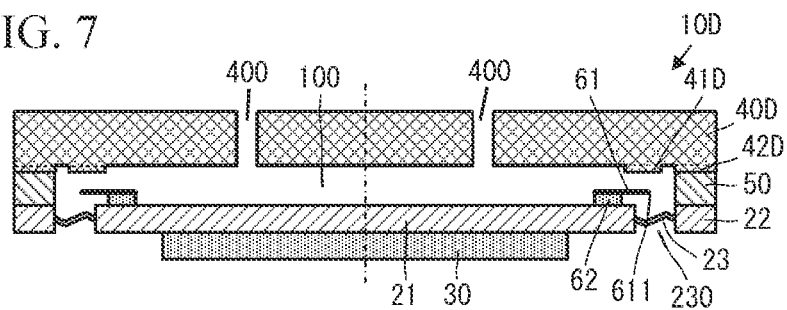

FLUID CONTROL DEVICE

CROSS REFERENCE TO RELATED APPLICATION

This is a continuation of International Application No. PCT/JP2021/003549 filed on Feb. 1, 2021 which claims priority from Japanese Patent Application No. 2020-030019 filed on Feb. 26, 2020. The contents of these applications are incorporated herein by reference in their entireties.

BACKGROUND OF THE DISCLOSURE

Field of the Disclosure

The present disclosure relates to a fluid control device that utilizes a piezoelectric material.

Description of the Related Art

Heretofore, a variety of fluid control devices that transport a fluid by utilizing a piezoelectric material have been proposed as described in Patent Document 1. The fluid control device described in Patent Document 1 transports a fluid by utilizing the vibrations generated by a piezoelectric material.

The fluid control device described in Patent Document 1 includes a film valve inside a pump chamber. The film valve is partially fixed in place and has a movable end. The movable end moves in accordance with the flow of a fluid inside the pump chamber, and as a result, the fluid control device realizes rectification.

For example, in the case where the film valve is fixed to a vibrating plate, the movable end of the film valve moves so as to contact the surface of the vibrating plate during forward flow. On the other hand, the movable end of the film valve moves so as to contact a top plate that faces the vibrating plate during reverse flow. Thus, the fluid control device allows the fluid to flow during forward flow and stops the flow of the fluid during reverse flow.

Patent Document 1: International Publication No. 2019/230159

BRIEF SUMMARY OF THE DISCLOSURE

However, in the fluid control device of the related art described in Patent Document 1, it might not be possible to obtain a sufficient reduction in flow path resistance even during forward flow.

Therefore, a possible benefit of the present disclosure is to provide a fluid control device that can more reliably reduce flow path resistance during forward flow.

A fluid control device of the present disclosure includes a first main plate, a second main plate, a driving body, a frame body, support portions, a side wall member, a valve member, and a second hole. The first main plate has a first main surface and a second main surface. The second main plate has a third main surface facing the first main surface, a fourth main surface on an opposite side from the third main surface, and a first hole that penetrates between the third main surface and the fourth main surface and through which a fluid flows. The driving body is disposed on the second main surface and causes the first main plate to vibrate. The frame body is provided closer to the outside than an outer edge of the first main plate. The support portions connect the frame body and the first main plate to each other and support the first main plate so that the first main plate can vibrate relative to the frame body. The side wall member is connected to the second main plate and the frame body and forms a pump chamber between the first main surface and the third main surface. The valve member includes a flexible valve film and a fixing member that fixes an inner end side of the valve film to the first main surface. The valve member has an inner end that is a fixed end and an outer end that is a movable end. The second hole is surrounded by an outer edge of the first main plate, the frame body, and two of the support portions that are adjacent to each other. The second hole allows communication between the inside of the pump chamber and the outside and the fluid passes therethrough. An outer end of the valve member overlaps the second hole when the first main surface is seen in plan view.

With this configuration, when a fluid flows in a forward direction, i.e., when the fluid is sucked into the inside of the pump chamber via the first hole, flows through the inside of the pump chamber from the center towards the outer edge of the pump chamber, and is discharged to the outside from the vicinity of the outer edge of the pump chamber via the second hole, the outer end of the valve enters the inside of the second hole. This enables the cross-sectional area of the flow path in the vicinity of the outer end of the valve film to be increased.

According to the present disclosure, flow path resistance during forward flow can be more reliably reduced.

BRIEF DESCRIPTION OF THE SEVERAL VIEWS OF THE DRAWINGS

FIG. 5A is a side view illustrating the configuration of a fluid control device according to a Third Embodiment, and FIG. 5B is a partial enlarged view of FIG. 5A.

FIG. 6 is a side view illustrating the configuration of a fluid control device according to a Fourth Embodiment.

FIG. 7 is a side view illustrating the configuration of a fluid control device according to a Fifth Embodiment.

DETAILED DESCRIPTION OF THE DISCLOSURE

First Embodiment

Figure 1:
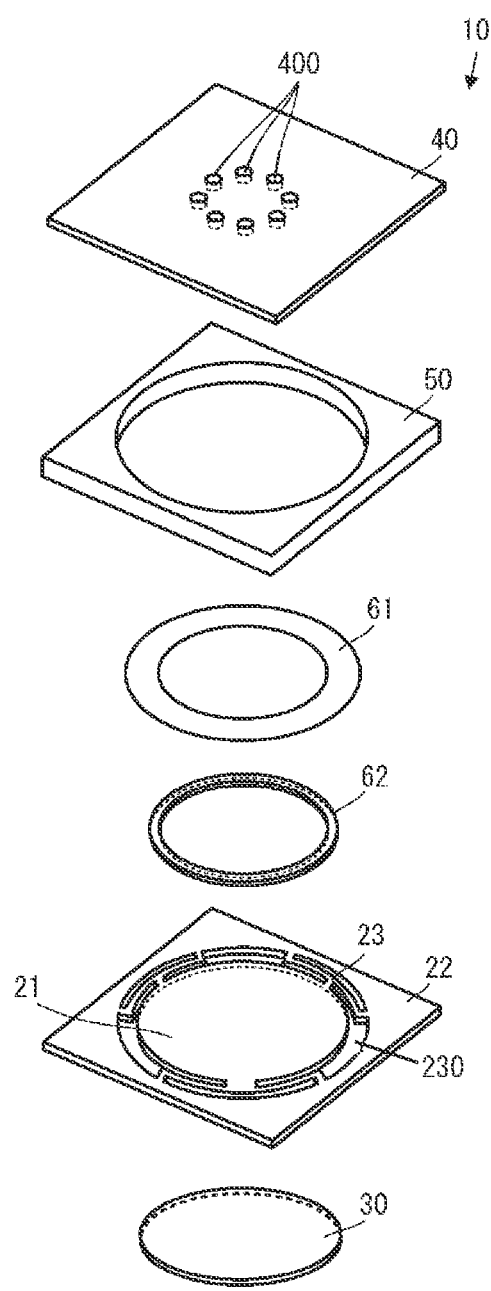
FIG. 1 is an exploded perspective view of a fluid control device according to a First Embodiment.
Figure 2A:
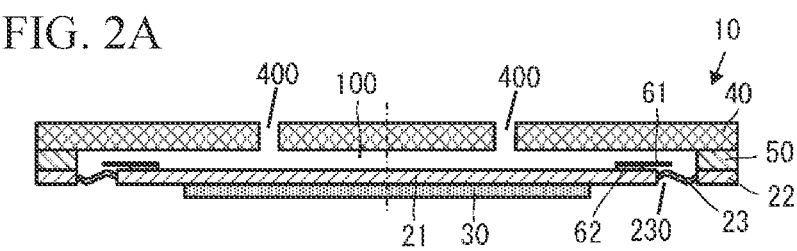
FIGS. 2A and 2B are side views illustrating the configuration of the fluid control device according to the First Embodiment.
Figure 2B:
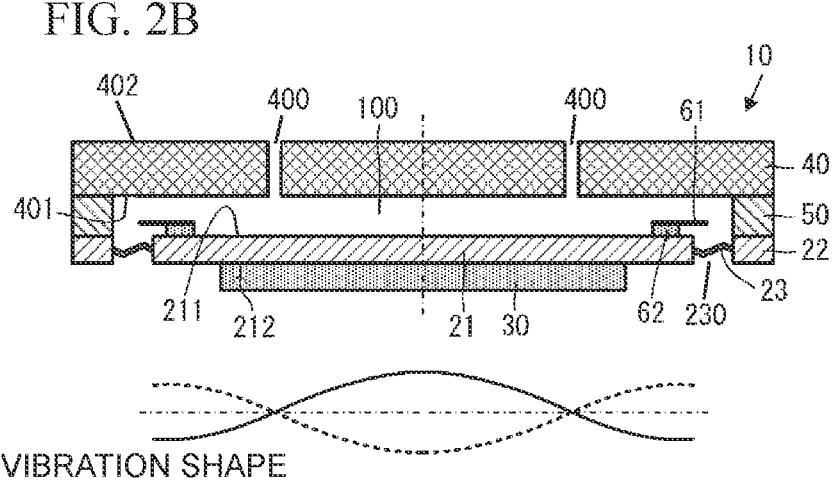
Figure 3A:
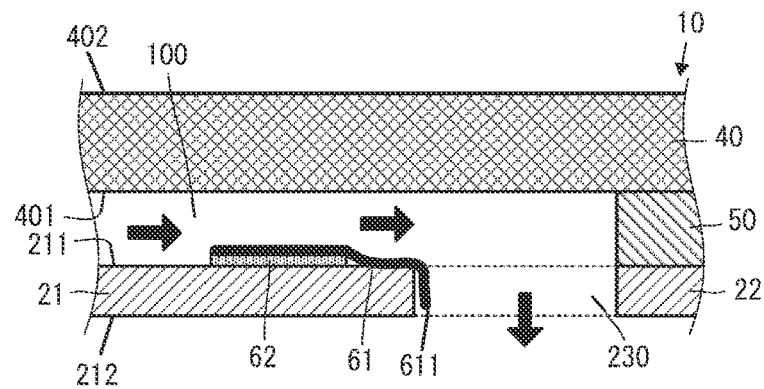
FIG. 3A is a partial enlarged view of a lateral cross section illustrating a deformation state of a valve film during forward flow.
Figure 3B:
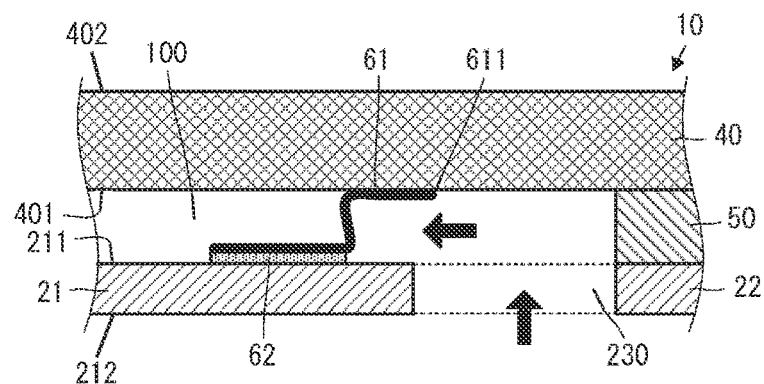
FIG. 3B is a partial enlarged view of a lateral cross section illustrating the deformation state of the valve film during reverse flow.

A fluid control device according to a First Embodiment of the present disclosure will be described while referring to the drawings. FIG. 1 is an exploded perspective view of the fluid control device according to the First Embodiment. FIGS. 2A and 2B are side views illustrating the configuration of the fluid control device according to the First Embodiment. FIGS. 2A and 2B illustrate the same configuration. FIG. 2A illustrates the configuration with dimensions close to those of the actual shape of the fluid control device, whereas FIG. 2B illustrates the configuration of the fluid control device with a particular emphasis on the height direction (thickness direction) in order to make it easier to understand. Furthermore, the shape of a vibration generated in the fluid control device is illustrated in FIG. 2B. FIG. 3A is a partial enlarged view of a lateral cross section illustrating the deformation state of a valve film during forward flow, and FIG. 3B is a partial enlarged view of a lateral cross section illustrating the deformation state of the valve film during reverse flow. In these drawings and in each of the drawings illustrated in the following embodiments, the shapes of the individual constituent elements are partially or entirely exaggerated in order to make the description easier to understand.

As illustrated in FIGS. 1, 2A, and 2B, a first main plate 21, a frame body 22, a plurality of support bodies 23, a plurality of gaps 230, a driving body 30, a second main plate 40, a side wall member 50, a valve film 61, and a fixing member 62 are provided.

The first main plate 21 is a flat plate having a circular shape in plan view. The first main plate 21 has circular main surfaces 211 and 212. The main surface 211 corresponds to a "first main surface" of the present disclosure, and the main surface 212 corresponds to a "second main surface" of the present disclosure. The main surface 211 and the main surface 212 are parallel to each other. The first main plate 21 is, for example, composed of a metal. The first main plate 21 is acceptable so long as a bending vibration can be initiated therein by the driving body 30. As illustrated by the vibration shape in FIG. 2B, a bending vibration is a vibration in which the main surface 211 and the main surface 212 are displaced in a wave-like shape when looking at the first main plate 21 from the side.

The frame body 22 is a flat plate and is disposed closer to the outside than an outer edge of the first main plate 21. The frame body 22 surrounds the first main plate 21 in plan view. In other words, the frame body 22 has a circular opening at the center of the flat plate. The shape of the opening is similar to and larger than the outer shape of the first main plate 21. The outer shape of the frame body 22 is, for example, a rectangular shape, as illustrated in FIG. 1. The outer shape of the frame body 22 is not limited to a rectangular shape.

The plurality of support bodies 23 have beam-like shapes. The plurality of support bodies 23 are disposed between the first main plate 21 and the frame body 22. The plurality of support bodies 23 are connected between the outer edge of the first main plate 21 and the inner edge of the frame body 22. The plurality of support bodies 23 are disposed so as to be spaced apart from each other along the outer edge of the first main plate 21. The number of support bodies 23 may be three or more, and the plurality of support bodies 23 may be disposed at regular intervals along the outer periphery of the first main plate 21.

The plurality of gaps 230 are disposed between the first main plate 21 and the frame body 22. The plurality of gaps 230 are parts formed by the plurality of support bodies 23 in the region between the first main plate 21 and the frame body 22.

With this configuration, the plurality of gaps 230 connect the space on the side near the main surface 211 of the first main plate 21 and the space on the side near the main surface 212 of the first main plate 21 to each other. Therefore, the plurality of gaps 230 correspond to a "second hole" of the present disclosure. In addition, the plurality of gaps 230 correspond to a "recess". Furthermore, the plurality of support bodies 23 have elasticity due to the plurality of support bodies 23 being formed with the plurality of gaps 230 interposed therebetween in this manner. In other words, the plurality of support bodies 23 support the first main plate 21 so that the first main plate 21 can vibrate relative to the frame body 22. "Support portions" of the present disclosure are formed by the plurality of support bodies 23 and the plurality of gaps 230.

The first main plate 21, the frame body 22, and the plurality of support bodies 23 are preferably formed so as to be integrated with each other. In other words, the first main plate 21, the frame body 22, and the plurality of support bodies 23 are preferably realized by punching a single flat plate using a prescribed method to form the plurality of gaps 230. In this way, a shape in which the first main plate 21 and the frame body 22 are connected to each other by the plurality of support bodies 23 and that includes the plurality of gaps 230 can be easily realized with precision. The first main plate 21, the frame body 22, and the plurality of support bodies 23 do not have to be formed so as to be integrated with each other. In other words, the first main plate 21, the frame body 22, and the plurality of support bodies 23 may be realized by connecting individual members to each other.

The driving body 30 is, for example, realized using a piezoelectric element. The piezoelectric element includes a disc-shaped piezoelectric body and driving electrodes. The driving electrodes are formed on both main surfaces of the disc-shaped piezoelectric body.

The driving body 30 is disposed on the main surface 212 of the first main plate 21. Here, the center of the driving body 30 and the center of the first main plate 21 substantially coincide in plan view. The piezoelectric element of the driving body 30 is deformed when a driving signal is applied to the driving electrodes. As described above, the first main plate 21 vibrates due to this deformation.

The second main plate 40 is a flat plate having a rectangular shape in plan view. The outer shape of the second main plate 40 does not have to be a rectangular shape. The outer shape of the second main plate 40 is acceptable as long as the outer shape is at least the same size as or larger than the outer shape of the frame body 22. The second main plate 40 is preferably composed of a material, has a thickness, and so forth such that bending vibrations are negligibly generated in the second main plate 40. The second main plate 40 has a main surface 401 and a main surface 402. The main surface 401 and the main surface 402 are parallel to each other. The second main plate 40 is disposed so that its main surface 401 faces the main surface 211 of the first main plate 21.

The second main plate 40 includes a plurality of holes 400. The plurality of holes 400 penetrate between the main surface 401 and the main surface 402 of the second main plate 40. The plurality of holes 400 correspond to a "first hole" of the present disclosure. The plurality of holes 400 are arrayed in a circular shape when the second main plate 40 is seen in plan view. When a fluid control device 10 is seen in plan view, the center of the diameter of the circular shape substantially coincides with the center of the first main plate 21.

The side wall member 50 is an annular-shaped column. The side wall member 50 is preferably composed of a material, has a thickness, and so forth such that bending vibrations are negligibly generated in the side wall member 50.

The side wall member 50 is disposed between the frame body 22 and the second main plate 40. One end of the side wall member 50 in the height direction is connected to the frame body 22. The other end of the side wall member 50 in the height direction is connected to the second main plate 40.

With this configuration, the fluid control device 10 is provided with a space that is surrounded by a flat plate consisting of the first main plate 21, the frame body 22, and the plurality of support bodies 23, and the second main plate 40 and the side wall member 50. This space serves as a pump chamber 100 of the fluid control device 10. The pump chamber 100 communicates with the plurality of holes 400 and the plurality of gaps 230. In other words, the pump chamber 100 communicates with the outside space on the side near the second main plate 40 of the fluid control device 10 via the plurality of holes 400 and communicates with the outside space on the side near the first main plate 21 of the fluid control device 10 via the plurality of gaps 230.

The valve film 61 is composed of a material having flexibility. The valve film 61 is acceptable so long so the valve film 61 has a degree of elasticity that makes it possible for the valve film 61 to be deformed by a fluid flowing through the pump chamber 100. The valve film 61 has a ring-like shape and has a prescribed width (length in radial direction). The inner diameter of the valve film 61 is larger than the diameter of the circle along which the plurality of holes 400 are disposed.

The fixing member 62 is, for example, composed of a material having adhesiveness such as double-sided tape. The fixing member 62 has a ring-like shape and has a prescribed width (length in radial direction). The width of the fixing member 62 is less than the width of the valve film 61. The inner diameter of the fixing member 62 is larger than the diameter of the circle along which the plurality of holes 400 are disposed and is the same as or substantially the same as the inner diameter of the valve film 61. The outer diameter of the fixing member 62 is less than the outer diameter of the valve film 61.

The fixing member 62 fixes the valve film 61 to the main surface 211 of the first main plate 21. Here, the center of the fixing member 62 substantially coincides with the center of the main surface 211. In addition, the inner end of the fixing member 62 substantially coincides with the inner end of the valve film 61. Thus, as illustrated in FIGS. 2A, 2B, 3A, and 3B, the inner end of the valve film 61 is fixed in place by the fixing member 62, and an outer end 611 of the valve film 61 is not fixed in place by the fixing member 62. Note that the inner end of the valve film 61 and the inner end of the fixing member 62 refer to the ends located at the center side when seen in plan view. In other words, the valve film 61 is fixed to the first main plate 21 in a state where the valve film 61 can deform with the inner end serving as a fixed end and the outer end 611 serving as a movable end. The fixing member 62 may fix the valve film 61 at a position shifted towards the outer end of the valve film 61 by a prescribed distance from the inner end of the valve film 61. In other words, the fixing member 62 is acceptable so long as the fixing member 62 fixes the inner end side of the valve film 61 such that the outer end 611 of the valve film 61 functions as a movable end.

With this configuration, from Bernoulli's principle, the fluid is sucked into the inside of the pump chamber 100 from the plurality of holes 400 (forward flow state) and the fluid flows inside the pump chamber 100 from the center towards the outer edge. As a result, the outer end 611 of the valve film 61 is pressed down towards the first main plate 21. Then, the fluid is discharged to the outside from the plurality of gaps 230.

In contrast, when the fluid is sucked into the inside of the pump chamber 100 from the plurality of gaps 230 (reverse flow state), the fluid tends to flow towards the center from the outer edge of the pump chamber 100. As a result, the outer end 611 of the valve film 61 is pushed up towards the second main plate 40 and contacts the main surface 401 of the second main plate 40. Therefore, inward flow of the fluid towards the center of the pump chamber 100 is suppressed (refer to FIG. 3B).

With the above-described configuration, in the fluid control device 10, as illustrated in FIGS. 2A and 2B, the outer end 611 of the valve film 61 extends into the gaps 230 when the outer end 611 is not deformed, i.e., in a state where the fluid is not flowing inside the pump chamber 100.

With this configuration, when the fluid flows in the forward direction (in a forward flow state), as illustrated in FIG. 3A, the outer end 611 of the valve film 61 is pushed by the fluid flowing from the center towards the outer edge of the pump chamber 100 and enters the insides of the gaps 230. This helps prevent the cross-sectional area of the flow channel in the vicinity of the outer edge of the first main plate 21 in the pump chamber 100 from being reduced by the valve film 61. In this way, the fluid control device 10 can reduce flow path resistance during forward flow.

In the above-described configuration, the plurality of holes 400 overlap a vibration node. This suppresses leakage of the fluid from the plurality of holes 400 to the outside. As a result, the fluid control device 10 can improve the fluid transport efficiency.

Furthermore, in the above description, an example is described in which the first main plate 21 has a circular shape, but the first main plate 21 may also be shaped like an ellipse or another shape that is not a perfect circle, or a polygon such as a regular polygon. However, when the first main plate 21 has a circular shape, the axial symmetry of the first main plate 21 with respect to an axis passing through the center of the pump chamber 100 is improved. As a result, vibration efficiency is improved, the lengths of flow paths in all directions from the center to the outer edge of the pump chamber 100 are identical, and fluid transport efficiency is improved.

In addition, in the above description, an example is described in which the outer shape of the valve film 61 is a circular shape, but the outer shape of the valve film 61 may instead be shaped like an ellipse or another shape that is not a perfect circle, or a polygon such as a regular polygon. However, when the valve film 61 has a circular shape, the blocking performance of the valve film 61 in all directions is improved. Furthermore, the states of flow paths in all directions from the center to the outer edge of the pump chamber 100 are identical and fluid transport efficiency is improved.

In addition, in the above-described configuration, the valve film 61 and the fixing member 62 have ring-like shapes. As a result, when the valve film 61 is fixed in place by the fixing member 62, for example, it is easy to release bubbles generated between the fixing member 62 and the first main plate 21 and between the fixing member 62 and the valve film 61. Therefore, adhesion of the valve film 61 to the first main plate 21 is improved.

Second Embodiment

Figure 4A:
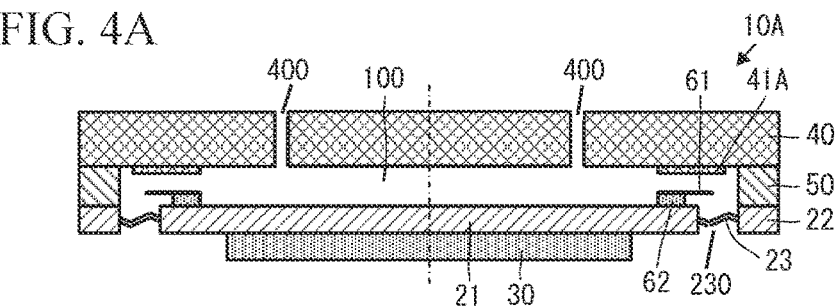
FIG. 4A is a side view illustrating the configuration of a fluid control device according to a Second Embodiment.

A fluid control device according to a second embodiment of the present disclosure will be described while referring to the drawings. FIG. 4A is a side view illustrating the configuration of the fluid control device according to the Second Embodiment, and FIG. 4B is a partial enlarged view of FIG. 4A.

Figure 4B:
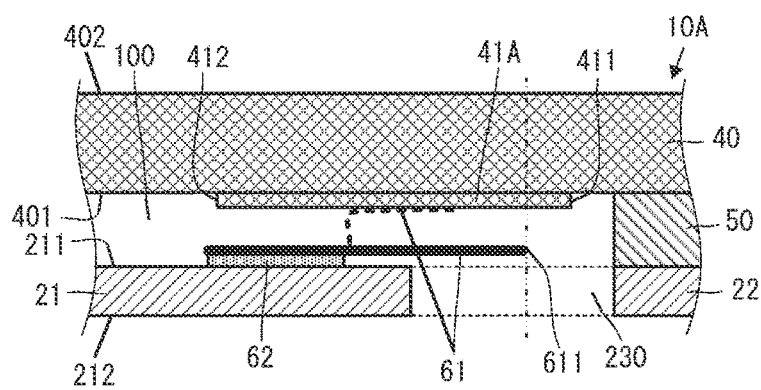
FIG. 4B is a partial enlarged view of FIG. 4A.

As illustrated in FIGS. 4A and 4B, a fluid control device 10A according to the Second Embodiment differs from the fluid control device 10 according to the First Embodiment in that the fluid control device 10A includes a protruding part 41A. The rest of the configuration of the fluid control device 10A is the same as that of the fluid control device 10 and description of these identical parts is omitted.

The fluid control device 10A includes the protruding part 41A. The protruding part 41A is shaped so as to protrude from the main surface 401 of the second main plate 40. The protruding part 41A has a ring-like shape having an outer edge 411 and an inner edge 412.

In plan view, the outer edge 411 of the protruding part 41A is located closer to the outer edge of the pump chamber 100 than the outer end 611 of the valve film 61. In other words, the outer edge 411 of the protruding part 41A is closer to an inner wall surface of the side wall member 50 than the outer end 611 of the valve film 61. In plan view, the inner edge 412 of the protruding part 41A overlaps the fixing member 62.

With this configuration, the outer end 611 of the valve film 61 overlaps the protruding part 41A in plan view. Thus, as illustrated in FIG. 4B, the distance between the outer end 611 of the valve film 61 and the protruding part 41A is less than that in the fluid control device 10 according to the First Embodiment. Therefore, during reverse flow, the outer end 611 of the valve film 61 easily contacts the protruding part 41A, and reverse flow of the fluid is more reliably suppressed.

The thickness of the protruding part 41A is preferably substantially the same as the thickness of the fixing member 62. As a result, the fluid control device 10A can reliably suppress reverse flow while suppressing an increase in flow path resistance during forward flow.

Furthermore, in the fluid control device 10A, the protruding part 41A and the fixing member 62 overlap in plan view. With this configuration, the outer end 611 of the valve film 61 and the protruding part 41A contact each other more reliably even when the outer end 611 of the valve film 61 is pushed into the region above the fixing member 62 during reverse flow. Thus, the fluid control device 10A can more reliably suppress reverse flow. Note that, in this case, at least the part of the protruding part 41A that overlaps the fixing member 62 is preferably thin, and an increase in flow path resistance during forward flow can be suppressed if this is thin.

Third Embodiment

A fluid control device according to a Third Embodiment of the present disclosure will be described while referring to the drawings. FIG. 5A is a side view illustrating the configuration of the fluid control device according to the Third Embodiment, and FIG. 5B is a partial enlarged view of FIG. 5A.

As illustrated in FIGS. 5A and 5B, a fluid control device 10B according to the Third Embodiment differs from the fluid control device 10A according to the Second Embodiment in terms of the shape of a protruding part 41B. The rest of the configuration of the fluid control device 10B is the same as that of the fluid control device 10A and description of these identical parts is omitted.

An inner edge 412 of the protruding part 41B is located closer to the outer edge of the pump chamber 100 than an outer edge 621 of the fixing member 62. In other words, the inner edge 412 of the protruding part 41B is closer to the inner wall of the side wall member 50 than the outer edge 621 of the fixing member 62. Thus, the protruding part 41B and the fixing member 62 do not overlap in plan view.

Therefore, an increase in flow path resistance can be further suppressed in the part of the pump chamber 100 where the fixing member 62 is disposed.

Fourth Embodiment

A fluid control device according to a fourth embodiment of the present disclosure will be described while referring to the drawings. FIG. 6 is a side view illustrating the configuration of the fluid control device according to the Fourth Embodiment.

As illustrated in FIG. 6, a fluid control device 10C according to the Fourth Embodiment differs from the fluid control device 10 according to the First Embodiment with respect to the positions at which the plurality of holes 400 are disposed. The rest of the configuration of the fluid control device 10C is the same as that of the fluid control device 10 and description of these identical parts is omitted.

The plurality of holes 400 overlap the fixing member 62 in plan view. This configuration helps to prevent fluid sucked into the inside of the pump chamber 100 from the plurality of holes 400 from hitting the wall of the inner edge of the fixing member 62. Consequently, flow turbulence inside the pump chamber 100 is suppressed. Therefore, the fluid control device 10C can further improve the transport efficiency.

Fifth Embodiment

A fluid control device according to a fifth embodiment of the present disclosure will be described while referring to the drawings. FIG. 7 is a side view illustrating the configuration of the fluid control device according to the Fifth Embodiment.

As illustrated in FIG. 7, a fluid control device 10D according to the Fifth Embodiment differs from the fluid control device 10B according to the Third Embodiment in that the fluid control device 10D includes a second main plate 40D. The rest of the configuration of the fluid control device 10D is the same as that of the fluid control device 10B and description of these identical parts is omitted.

The fluid control device 10D includes the second main plate 40D. The second main plate 40D includes a main body flat plate, a protruding part 41D, and a side wall protruding part 42D. The main body flat plate, the protruding part 41D, and the side wall protruding part 42D are formed so as to be integrated with each other. In other words, the main body flat plate, the protruding part 41D, and the side wall protruding part 42D are formed by cutting a single flat plate, for example.

Similar to the protruding part 41B of the fluid control device 10B, the protruding part 41D is shaped so as to protrude from the surface of the main body flat plate of the second main plate 40D on the side where the first main plate 21 is located. The protruding part 41D overlaps the outer end of the valve film 61.

The side wall protruding part 42D is shaped so as to protrude towards the side wall member 50 on the surface of the main body flat plate of the second main plate 40D facing the side wall member 50.

An end surface of the protruding part 41D (surface on opposite side from main body surface) and an end surface of the side wall protruding part 42D (surface on opposite side from main body surface) lie on the same plane (the end surfaces lie on a single plane). In other words, the end surface of the protruding part 41D and the bonding plane between the second main plate 40D and the side wall member 50 lie on the same plane.

With this configuration, the distance between the valve film 61 and the protruding part 41D can be realized in a stable manner. Thus, the fluid control device 10D can realize stable fluid transportation characteristics.

Note that the main body flat plate, the protruding part 41D, and the side wall protruding part 42D are preferably formed so as to be integrated with each other, but may instead be separate members. In this case, it is sufficient that the protruding part 41D and the side wall protruding part 42D be bonded to the main body flat plate, and then, for example, the end surface of the protruding part 41D and the end surface of the side wall protruding part 42D be simultaneously polished. In this way, it can be ensured that the end surface of the protruding part 41D and the end surface of the side wall protruding part 42D lie in the same plane.

Furthermore, in this configuration, the side wall member 50 may be a bonding material. As a result, the height of the pump chamber 100 is determined by the side wall protruding part 42D, and a more stable shape can be realized for the fluid control device 10D.

Sixth Embodiment

Figure 8:
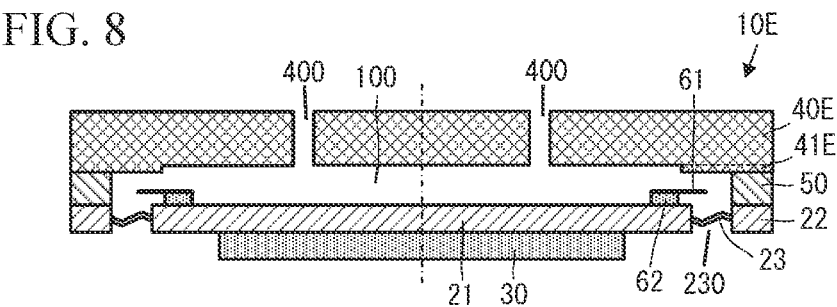
FIG. 8 is a side view illustrating the configuration of a fluid control device according to a Sixth Embodiment.

A fluid control device according to a sixth embodiment of the present disclosure will be described while referring to the drawings. FIG. 8 is a side view illustrating the configuration of the fluid control device according to the Sixth Embodiment.

As illustrated in FIG. 8, a fluid control device 10E according to the Sixth Embodiment differs from the fluid control device 10D according to the Fifth Embodiment in that the fluid control device 10E includes a second main plate 40E. The rest of the configuration of the fluid control device 10E is the same as that of the fluid control device 10D and description of these identical parts is omitted.

The fluid control device 10E includes the second main plate 40E. The second main plate 40E includes a main body flat plate and a protruding part 41E. The main body flat plate and the protruding part 41E are formed so as to be integrated with each other.

The protruding part 41E has a shape that is obtained by connecting the protruding part 41D and the side wall protruding part 42D according to the Fifth Embodiment to each other so as to be integrated with each other. In other words, the inner edge of the protruding part 41E overlaps the valve film 61, and the outer edge of the protruding part 41E substantially coincides with the outer edge of the side wall member 50 in plan view.

In this configuration, the surface of the second main plate 40E in the vicinity of the outer edge of the pump chamber 100 is flat. This suppresses turbulent flow near the outer edge of the pump chamber 100. Therefore, the fluid control device 10E can improve the fluid transport efficiency.

Seventh Embodiment

Figure 9:
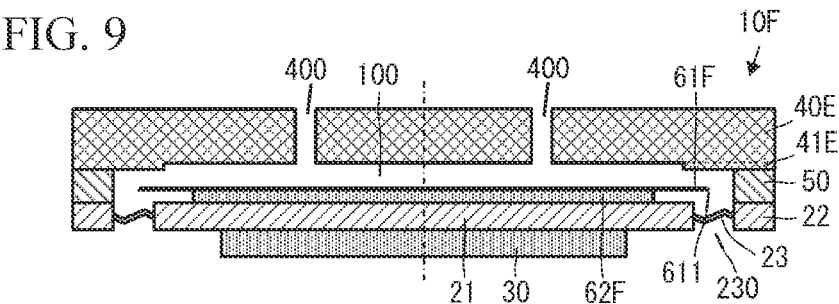
FIG. 9 is a side view illustrating the configuration of a fluid control device according to a Seventh Embodiment.

A fluid control device according to a seventh embodiment of the present disclosure will be described while referring to the drawings. FIG. 9 is a side view illustrating the configuration of the fluid control device according to the Seventh Embodiment.

As illustrated in FIG. 9, a fluid control device 10F according to the Seventh Embodiment differs from the fluid control device 10E according to the Sixth Embodiment in that the fluid control device 10F includes a valve film 61F and a fixing member 62F. The rest of the configuration of the fluid control device 10F is the same as that of the fluid control device 10E and description of these identical parts is omitted.

The valve film 61F has a circular shape. The fixing member 62F has a circular shape. In other words, the valve film 61F and the fixing member 62F are shaped so as not to have openings at the centers thereof. The valve film 61F is fixed to the first main plate 21 by the fixing member 62F except for an outer end 611 part of the valve film 61F.

With this configuration, the first main plate 21 side of the pump chamber 100 has a flat surface. As a result, the distance between the main surface 401 and the valve film 61F inside the pump chamber 100 is uniform and flow turbulence can be suppressed. Therefore, the fluid control device 10F can improve the fluid transport efficiency.

Eighth Embodiment

Figure 10:
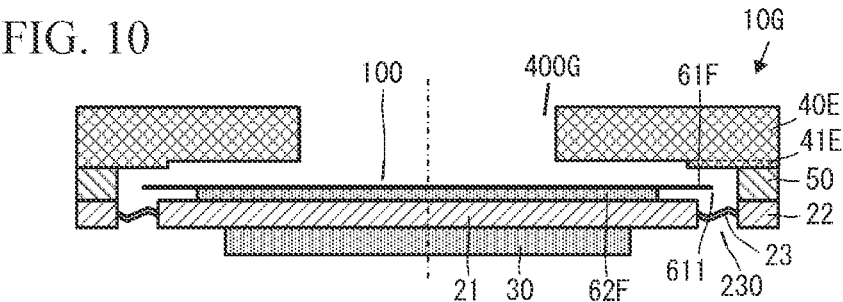
FIG. 10 is a side view illustrating the configuration of a fluid control device according to an Eighth Embodiment.

A fluid control device according to an Eighth Embodiment of the present disclosure will be described while referring to the drawings. FIG. 10 is a side view illustrating the configuration of the fluid control device according to the Eighth Embodiment.

As illustrated in FIG. 10, a fluid control device 10G according to the Eighth Embodiment differs from the fluid control device 10F according to the Seventh Embodiment in that the fluid control device 10G includes a hole 400G. The rest of the configuration of the fluid control device 10G is the same as that of the fluid control device 10F and description of these identical parts is omitted.

The fluid control device 10G includes one hole 400G. The hole 400G penetrates through the second main plate 40E. The area of the opening of the hole 400G is greater than the area of the openings of the holes 400 illustrated in the above embodiments. For example, the diameter of the hole 400G is of a similar size to the diameter of the circle along which the plurality of holes 400 are disposed as described above.

With this configuration as well, the fluid control device 10G can exhibit a similar operation effect to the fluid control device 10F.

Ninth Embodiment

Figure 11:
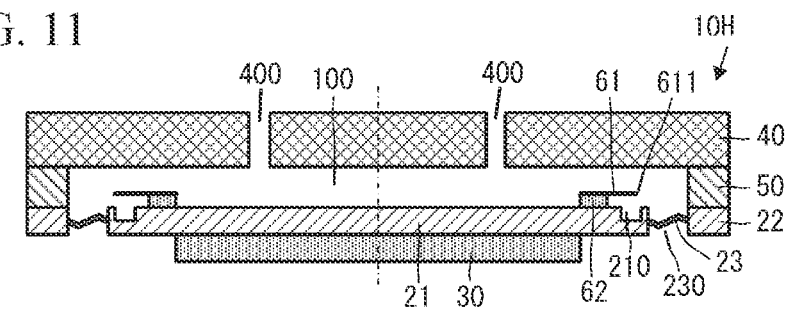
FIG. 11 is a side view illustrating the configuration of a fluid control device according to a Ninth Embodiment.

A fluid control device according to a Ninth Embodiment of the present disclosure will be described while referring to the drawings. FIG. 11 is a side view illustrating the configuration of the fluid control device according to the Ninth Embodiment.

As illustrated in FIG. 11, a fluid control device 10H according to the Ninth Embodiment differs from the fluid control device 10 according to the First Embodiment in that the fluid control device 10H includes a recess 210. The rest of the configuration of the fluid control device 10H is the same as that of the fluid control device 10 and description of these identical parts is omitted.

The fluid control device 10H includes the recess 210. The recess 210 is shaped so as to be recessed from the surface of the first main plate 21 on the side where the pump chamber 100 is located (the main surface 211 described above). The recess 210 overlaps the outer end 611 of the valve film 61 in plan view.

With this configuration, the outer end 611 of the valve film 61 sits in the recess 210 during forward flow. This makes it possible to reduce flow path resistance in the vicinity of the outer end 611 of the valve film 61. In this case, provided that the outer end 611 of the valve film 61 sits in the recess 210 during forward flow of the fluid, a similar operational effect to that achieved by the above-described configurations can be achieved even if the recess 210 does not overlap the outer end 611 of the valve film 61 in a state where the fluid is not flowing.

In addition, the configurations of the above-described embodiments can be combined with one another as appropriate and operational effects of those combinations can be achieved.

10, 10A, 10B, 10C, 10D, 10E, 10F, 10G, 10H: fluid control device
21: first main plate
22: frame body
23: support body
30: driving body
40, 40D, 40E: second main plate
41A, 41B, 41D, 41E: protruding part
42D: side wall protruding part
50: side wall member
61, 61F: valve film
62, 62F: fixing member
100: pump chamber
210: recess
211, 212: main surface
230: gap
400: hole
401, 402: main surface
411: outer edge
412: inner edge
611: outer end
621: outer edge

The invention claimed is:

1. A fluid control device comprising:
a first main plate having a first main surface and a second main surface;
a second main plate having a third main surface facing the first main surface and a fourth main surface on an opposite side from the third main surface, and having a first hole penetrating between the third main surface and the fourth main surface and through which a fluid flows;
a driving body disposed on the second main surface and causing the first main plate to vibrate;
a frame body provided at an outer side than an outer edge of the first main plate;
support portions connecting the frame body and the first main plate to each other and supporting the first main plate to allow the first main plate to vibrate relative to the frame body;
a side wall member connecting the second main plate and the frame body to each other and providing a pump chamber between the first main surface and the third main surface;
a valve member including a flexible valve film and a fixing member, the fixing member fixing an inner end side of the valve film to the first main surface, the valve member having an inner end being a fixed end and an outer end being a movable end; and
a second hole surrounded by an outer edge of the first main plate, the frame body, and two of the support portions adjacent to each other, allowing communication between an inside of the pump chamber and an outside of the pump chamber, and through which the fluid passes,
wherein an outer end of the valve member overlaps the second hole when the first main surface is seen in plan view.

2. A fluid control device comprising:
a first main plate having a first main surface and a second main surface;
a second main plate having a third main surface facing the first main surface and a fourth main surface on an opposite side from the third main surface, and having a first hole penetrating between the third main surface and the fourth main surface and through which a fluid flows;
a driving body disposed on the second main surface and causing the first main plate to vibrate;
a frame body provided at an outer side than an outer edge of the first main plate;
support portions connecting the frame body and the first main plate to each other and supporting the first main plate to allow the first main plate to vibrate relative to the frame body;
a side wall member connecting the second main plate and the frame body to each other and providing a pump chamber between the first main surface and the third main surface;
a valve member including a flexible valve film and a fixing member, the fixing member fixing an inner end side of the valve film to the first main surface, the valve member having an inner end being a fixed end and an outer end being a movable end; and
a second hole surrounded by an outer edge of the first main plate, the frame body, and two of the support portions adjacent to each other, allowing communication between an inside of the pump chamber and an outside of the pump chamber, and through which the fluid passes,
wherein a recess recessed from the first main surface where the fixing member is placed is provided in a part of the first main surface overlapping an outer end of the valve member when the first main surface is seen in plan view.

3. The fluid control device according to claim 1,
wherein the second main plate includes a protruding part protruding from the third main surface, and
the protruding part overlaps an outer end of the valve film in plan view.

4. The fluid control device according to claim 3,
wherein the protruding part does not overlap the fixing member in plan view.

5. The fluid control device according to claim 3,
wherein the protruding part overlaps the fixing member in plan view.

6. The fluid control device according to claim 3,
wherein the protruding part is provided so as to be integrated with the second main plate.

7. The fluid control device according to claim 3,
wherein an end surface of the protruding part of the second main plate and a bonding surface where the second main plate is bonded to the side wall member lie on the same plane.

8. The fluid control device according to claim 1, wherein the first hole overlaps the fixing member in plan view.

9. The fluid control device according to claim 1, wherein the valve film and the fixing member have annular shapes.

10. The fluid control device according to claim 1, wherein the valve film and the fixing member are shaped so as not to have openings at centers thereof.

11. The fluid control device according to claim 1, wherein an outer shape of the valve film is a circular shape.

12. The fluid control device according to claim 2, wherein the second main plate includes a protruding part protruding from the third main surface, and the protruding part overlaps an outer end of the valve film in plan view.

13. The fluid control device according to claim 4, wherein the protruding part is provided so as to be integrated with the second main plate.

14. The fluid control device according to claim 5, wherein the protruding part is provided so as to be integrated with the second main plate.

15. The fluid control device according to claim 4, wherein an end surface of the protruding part of the second main plate and a bonding surface where the second main plate is bonded to the side wall member lie on the same plane.

16. The fluid control device according to claim 5, wherein an end surface of the protruding part of the second main plate and a bonding surface where the second main plate is bonded to the side wall member lie on the same plane.

17. The fluid control device according to claim 6, wherein an end surface of the protruding part of the second main plate and a bonding surface where the second main plate is bonded to the side wall member lie on the same plane.

18. The fluid control device according to claim 2, wherein the first hole overlaps the fixing member in plan view.

19. The fluid control device according to claim 3, wherein the first hole overlaps the fixing member in plan view.

20. The fluid control device according to claim 4, wherein the first hole overlaps the fixing member in plan view.

* * * * *